US008165546B2

(12) United States Patent
Ingrassia et al.

(10) Patent No.: US 8,165,546 B2
(45) Date of Patent: Apr. 24, 2012

(54) COMMUNICATING RADIO PRESETS BETWEEN A PORTABLE MEDIA PLAYER AND AN ACCESSORY

(75) Inventors: Michael Ingrassia, San Jose, CA (US); Jeffery T. Lee, Sunnyvale, CA (US); Brent Schorsch, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 437 days.

(21) Appl. No.: 12/435,845

(22) Filed: May 5, 2009

(65) Prior Publication Data

US 2010/0285763 A1 Nov. 11, 2010

(51) Int. Cl.
*H04B 1/18* (2006.01)
(52) U.S. Cl. .................. 455/185.1; 455/166.2
(58) Field of Classification Search .................. None
See application file for complete search history.

(56) References Cited

U.S. PATENT DOCUMENTS

| | | | |
|---|---|---|---|
| 5,964,847 A | 10/1999 | Booth, III et al. | |
| 7,054,601 B2 * | 5/2006 | Heiderscheit et al. | 455/179.1 |
| 7,062,261 B2 | 6/2006 | Goldstein et al. | |
| 7,171,174 B2 | 1/2007 | Ellis et al. | |
| 7,187,947 B1 | 3/2007 | White et al. | |
| 7,281,214 B2 | 10/2007 | Fadell | |
| 7,293,122 B1 | 11/2007 | Schubert et al. | |
| 7,343,141 B2 | 3/2008 | Ellis et al. | |
| 7,441,058 B1 | 10/2008 | Bolton et al. | |
| 7,526,588 B1 | 4/2009 | Schubert et al. | |
| 7,529,870 B1 | 5/2009 | Schubert et al. | |
| 7,529,871 B1 | 5/2009 | Schubert et al. | |
| 7,529,872 B1 | 5/2009 | Schubert et al. | |
| 2003/0040272 A1 | 2/2003 | Lelievre et al. | |
| 2003/0220988 A1 | 11/2003 | Hymel | |
| 2004/0019497 A1 | 1/2004 | Volk et al. | |
| 2004/0116005 A1 | 6/2004 | Choi | |
| 2004/0267812 A1 | 12/2004 | Harris et al. | |
| 2005/0181756 A1 | 8/2005 | Lin | |
| 2006/0258289 A1 | 11/2006 | Dua | |
| 2008/0167016 A1 * | 7/2008 | Swanburg et al. | 455/414.1 |

* cited by examiner

*Primary Examiner* — Cassandra Cox
(74) *Attorney, Agent, or Firm* — Kilpatrick Townsend & Stockton LLP (57) ABSTRACT

Radio station presets lists can be communicated between a portable media device and an accessory. A radio station presets list can include a listing of radio stations associated with a particular location. The portable media device can determine a current location, select a presets list for the current location (or create a new presets list for the location), and communicate the presets list to the accessory. The portable media device can, periodically or upon request from the accessory, update its location and send a new presets list, if available, to the accessory. After the portable media device and the accessory are disconnected, the accessory can resume using its own presets list.

26 Claims, 7 Drawing Sheets

| COMMAND | PAYLOAD |
|---|---|
| IsPresetsListAvailable | None |
| NotifyPresetsList | Status/Identifier |
| RequestPresetsList | Presets List Identifier |
| SendPresetsList | Presets List |
| RequestPresetsCap | Presets Capabilites |
| SendPresetsCap | Presets Capabilites |
| PMDAck | Status |
| AccAck | Status |
| UpdatePresetsList | Updated Presets List |
| UpdateLocation | None |

COMMUNICATING RADIO PRESETS BETWEEN A PORTABLE MEDIA PLAYER AND AN ACCESSORY

BACKGROUND

The present disclosure relates generally to media players and in particular to communicating radio presets between a media player and an accessory.

A portable media device (PMD) can store media assets, such as audio tracks, video tracks or photos that can be played or displayed on the portable media device. Examples of portable media devices are the iPod® and the iPhone™ portable media devices, which are available from Apple Inc. of Cupertino, Calif.

A portable media device can include one or more connectors or ports that can be used to interface with other devices. For example, the connector or port can enable the portable media device to couple to a host computer, be inserted into a docking system, or receive an accessory device. In the case of the iPod®, e.g., a vast array of accessory devices have been developed that can interconnect to the portable media device.

In some instances, the portable media device can have the capability to play live radio. For example, there are various radio tuner applications and accessories that can enable the iPod® and the iPhone™ to play live radio.

There are a myriad of radio stations currently in service. Several of the currently active radio stations play specific genres of music, e.g., Rap, Rock and Roll, Country, Gospel, etc. In addition, several radio stations play music from multiple genres or from the same genre. Radio stations are assigned a particular geographic area within which they operate. Keeping track of all the radio stations within a particular geographic area and organizing them in an easily accessible way can provide a user with enhanced radio listening experience. A presets list is a convenient way of grouping radio stations that can share a common characteristic, e.g., user preference. A presets list can be helpful in providing quick access to the radio stations a user listens to most.

SUMMARY

Certain embodiments of the present invention relate to methods of communicating presets list between a portable media device and an accessory. A portable media device can have the ability to play live radio. In some embodiments, the portable media device can store multiple radio station presets lists. A radio station presets list can be a listing of one or more radio stations organized based on one or more criteria. In some embodiments, a radio station presets list can include a listing of radio stations that are associated with a particular location.

Ability to create and store multiple presets lists can allow a user to organize radio stations of his choice according to various criteria. This can enable easy retrieval of radio stations for use when needed. For example, if the user is at location A, he can select a presets list associated with location A without having to scan through all radio stations available for that location to find a particular radio station. In some embodiments, the presets lists can be created external to the portable media device. In some embodiments, the portable media device can have the ability to determine a current location and create a presets list for the current location.

In some embodiments, the portable media device can send the presets list for a current location to an accessory. The accessory can use the received presets list to control its own radio tuner. After the portable media device and the accessory are disconnected, the accessory can resume using its own presets list.

The following detailed description, together with the accompanying drawings will provide a better understanding of the nature and advantages of the present invention.

DETAILED DESCRIPTION

Certain embodiments of the present invention relate to methods of communicating presets list between a portable media device and an accessory. A portable media device can have the ability to play live radio. In some embodiments, a user can create and store one or more radio station presets lists on the portable media device. A radio station presets list can be a listing of radio stations that are organized based on one or more criteria. The various radio stations included in a presets list can be associated with controls that can allow a user to access a particular radio station by operating the controls, e.g., pushing a button to tune to a radio station. In some embodiments, each radio station presets list can be associated with a location and can include radio stations associated with that location. In some embodiments, the portable media device can have the ability to determine a current location and select the presets list associated with the current location. The presets lists can be created external to the portable media device or by interaction with a user. In some embodiments, the portable media device can determine a location and automatically create a presets list associated with that location.

In some embodiments, the portable media device can send the presets list associated with a current location to an accessory. The accessory can use the received presets list to control its own radio tuner. In some embodiments, after the portable media device and the accessory are disconnected, the accessory can resume using its own built-in presets lists.

Figure 1:
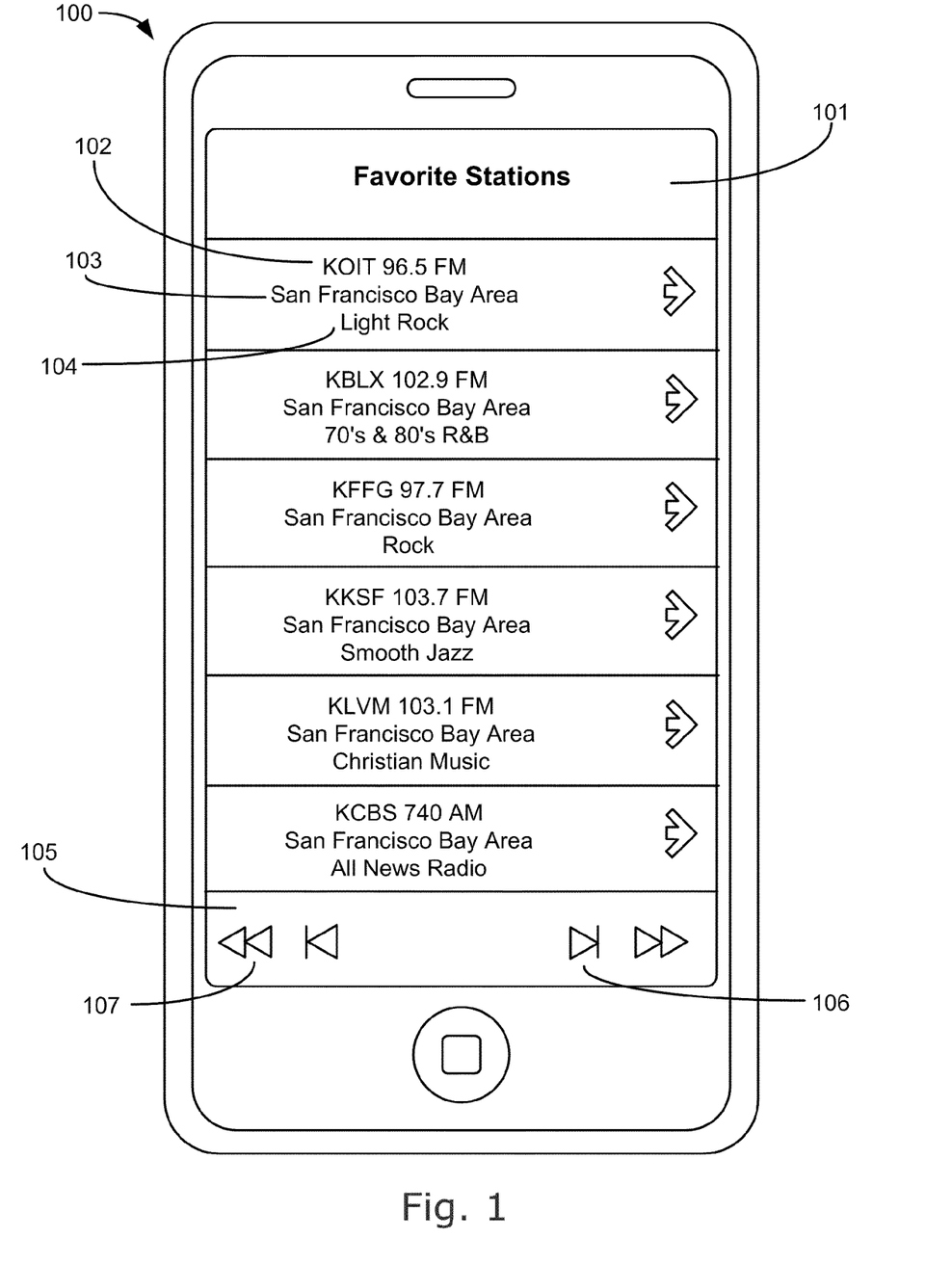
FIG. 1 illustrates a portable media device with a user interface screen displaying a list of available radio stations according to an embodiment of the present invention.

FIG. 1 illustrates portable media device (PMD) 100 including display 101. PMD 100 can have the ability to play live radio using a radio tuner (not shown). The radio tuner can be either internal or external to PMD 100. The radio tuner can receive signals from the available radio stations in a particular geographic area and provide information about the available stations to PMD 100. Based on the information received from the radio tuner and other information (e.g., user preferences), PMD 100 can display a customized list of radio stations, e.g., radio stations of interest to the user (presets list), on display 101, in addition to other information. In some embodiments, the presets list can include details about individual radio stations. For example, PMD 100 can display the name, operating frequency, and band of the radio station (102), information about the geographical area that the radio station operates in (103), the genre of the content broadcast by the radio station (104), etc. PMD 100 can provide the user with ability to scroll through the listing of radio stations. The user can tune to any radio station on the list by selecting (e.g., touching) the corresponding list entry. In some embodiments, PMD 100 can also provide the ability to control a radio tuner using controls 105. In some embodiments, controls 105 can include a set of controls 106 (e.g. scan) that can be operated by the user to manually tune to a particular radio station and a set of controls 107 (e.g. seek) that can be operated by the user to instruct the tuner to tune to the next available radio station.

A radio station presets list can be created in various ways. In some embodiments, the user can select, from among the available radio stations, the radio stations that he wants included in a presets list. For instance, while listening to a particular station, the user can operate an "add to favorites" control (not explicitly shown in FIG. 1). In some embodiments, a presets list can be automatically created by PMD 100 based on various criteria, such as the user's listening habits and/or preferences for particular types of music. In some embodiments, the presets list can be created externally and then stored on PMD 100. For example, PMD 100 can communicate with a host computer (not explicitly shown) that executes a media asset management program (such as the iTunes® media asset management program distributed by Apple Inc.). The media asset management program can enable a user to add radio station presets list to PMD 100 and/or remove radio station presets lists from PMD 100. In some embodiments, the host computer maintains a master database of media assets (including radio station presets lists), and the media asset management program can automatically synchronize the master database with the database maintained internally to PMD 100 whenever PMD 100 connects to the host computer. In some embodiments, the host computer can also maintain a library that lists all the radio stations in a particular geographic area. The user can create a presets list by selecting radio stations from the listing. Presets lists can also be created using other techniques, e.g., analyzing media content in user's library to ascertain the genre that the user listens to the most and comparing with the genre associated with the radio stations. Those skilled in the art will appreciate that the present disclosure does not depend on any particular mechanism or technique for creating presets lists.

In some embodiments, PMD 100 can generate a radio station preset list automatically by scanning the radio frequency (RF) spectrum at the current location, determining which radio stations are available, and populating the presets list with radio stations selected based on one or more criteria. For example, PMD 100 can rank the available radio stations using one or more criteria, e.g., signal strength, number of presets that the accessory can accommodate, user preferences, etc., and use these criteria to select radio stations for a presets list. In some embodiments, a user can input a list of radio stations, categorized by location, to PMD 100. In some embodiments, a user can select a radio station to be included in a presets list while listening to that radio station and can instruct PMD 100 to save the radio station in a current presets list. PMD 100 can subsequently or concurrently associate the presets list with the current location.

Figure 2:
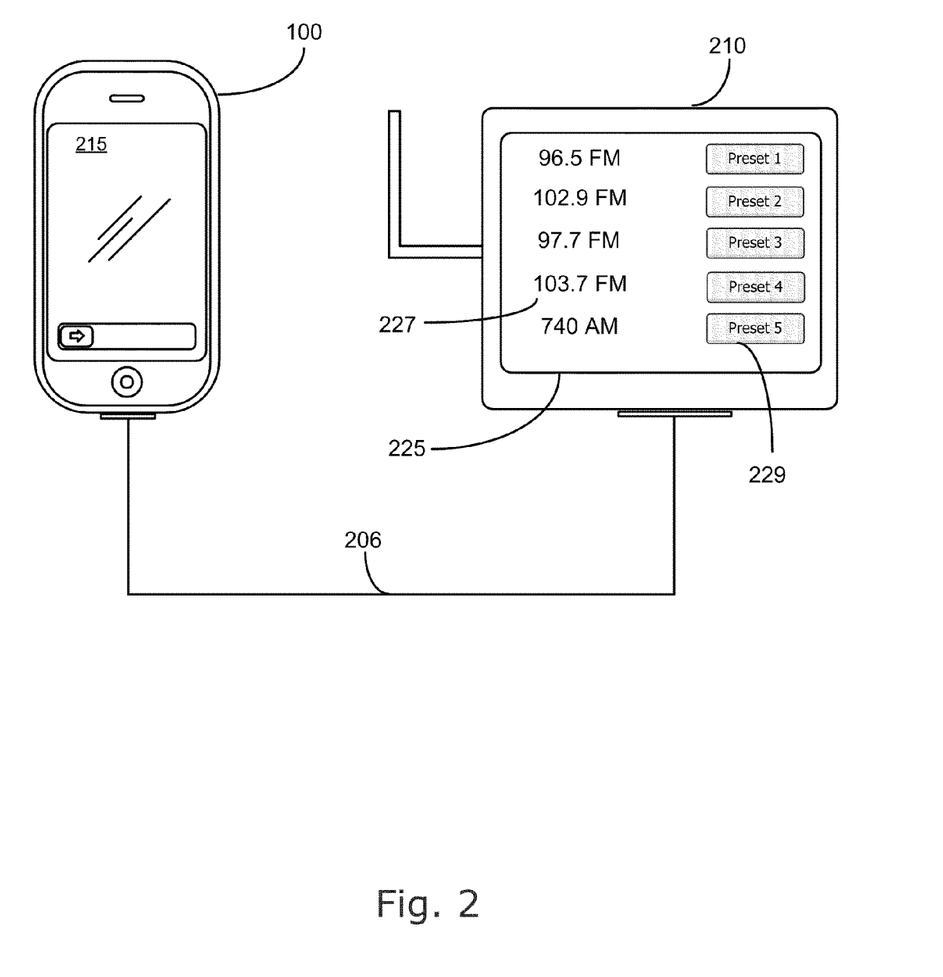
FIG. 2 illustrates a functional diagram of a portable media device coupled to an accessory according to an embodiment of the present invention.

In some embodiments, PMD 100 can share a presets list with an accessory. FIG. 2 illustrates PMD 100 coupled to accessory 210 according to an embodiment of the present invention. Accessory 210 can be any accessory that has a radio tuner, e.g., a home stereo system or an in-vehicle media unit, The coupling of PMD 100 to accessory 210 can be achieved in various ways, e.g., direct connection between mating connectors of PMD 100 and accessory 210 (not shown), indirect connection using cable 206 as shown, wireless connection, physical placement of PMD 100 in an opening in accessory 210, or the like.

PMD 100 can include a radio tuner (not shown) for playing live radio. In addition, as described above, PMD 100 can have the capability of generating and/or storing radio station presets lists. A radio stations presets list can be accessible via PMD display 215, e.g., while the user is listening to the radio using PMD 100. The user can interact with the presets list to select a radio station to listen to, e.g., by touching the radio station's name on PMD display 215. While PMD 100 is connected to accessory 215, the PMD's radio station presets list(s) can be made accessible via accessory display 225. For example, PMD 100 can have one or more radio station presets lists stored on an internal storage device (not shown), and each presets list can be associated with a location In some embodiments, PMD 100 can determine a current location, select a radio station presets list that is associated with the current location, and provide the selected list to accessory 210. In some embodiments, PMD 100 can scan the RF spectrum, analyze the radio station signals, and determine a current location based on the analysis of the radio signals. In other embodiments, PMD 100 can determine a current location using other location detection techniques, e.g., a GPS receiver, using cellular phone tower triangulation, wireless access points, or the like.

In some embodiments, the PMD can extract information about the available radio stations and their operating frequencies by analyzing the RF spectrum at that particular location using its tuner while accessory 210 plays a radio station using its tuner. Location determination using RF spectrum analysis can be based on the following principles. Each radio station is assigned a fixed operating frequency and can operate in a fixed geographical area. For example, the AM radio stations are normally spread over the range of 535-1605 Kilohertz (kHz) and FM radio stations normally occupy the 88 to 108 Megahertz (MHz) range of the RF spectrum. Within the prescribed ranges (or bands), each radio station is assigned a particular operating frequency in a particular geographical region. For instance, the frequency of 96.5 MHz is associated with the radio station KOIT in the San Francisco Bay geographical area and with the radio station WAKS in Cleveland, Ohio. The strength of the signal associated with a radio station can vary within the operational geographical area of that radio station. Typically, the signal strength of a radio station will be weaker along the outer limits of its operational geographical area. In some embodiments, PMD 100 can use signal strength information of some or all of the available radio stations to determine a location. For example, since the same frequency may be in use in different geographical areas, information about signal strength at a single frequency may not be sufficient to reliably identify a geographical area; however, since different combinations of frequencies are in use in different areas, information about signal strengths at a number of different frequencies (e.g., all frequencies in the FM band) is usually sufficient.

Accessory 210 can also have a radio tuner for tuning to and playing live radio; thus, a user can listen to the radio using the tuner of accessory 210 while PMD 100 uses its tuner for other purposes (such as scanning the spectrum.). In some embodiments, accessory 210 can have the ability to store multiple radio station presets list. A user can access a presets list stored on the accessory either by using display 225 or by operating designated preset buttons, described below. In some embodiments, the one or more radio stations 227 associated with a presets list can be displayed on accessory display 225, in addition to other information. Accessory display 225 can be a touch screen that provides user operable interface elements 229, e.g., buttons, icons, etc. that a user can touch in order to play a radio station. In some embodiments, accessory display 225 may not be touch-sensitive and can be configured to only display information. Instead, accessory 210 can have physical user operable devices, e.g., preset buttons, that can be assigned to access radio stations stored in accessory 210. For example, accessory 210 can have one or more preset buttons, each of which is associated with a particular radio station. A user can tune to the radio station associated with a preset button by pressing that button. The number of radio station presets that a particular accessory supports can depend on the configuration of the accessory (e.g., the number of preset buttons and/or size of the display).

In some embodiments, accessory 210 can download a radio station presets list from PMD 100. The downloaded radio station presets can be automatically assigned to the available preset buttons on the accessory. In some embodiments, the PMD may "push" the radio station presets list to the accessory without waiting for the accessory to request or download the presets list. In some embodiments, PMD 100 can send a notification to accessory about availability of a presets list prior to sending the presets list, and the accessory can control whether and when the presets list is downloaded. Examples are described below.

Figure 3:
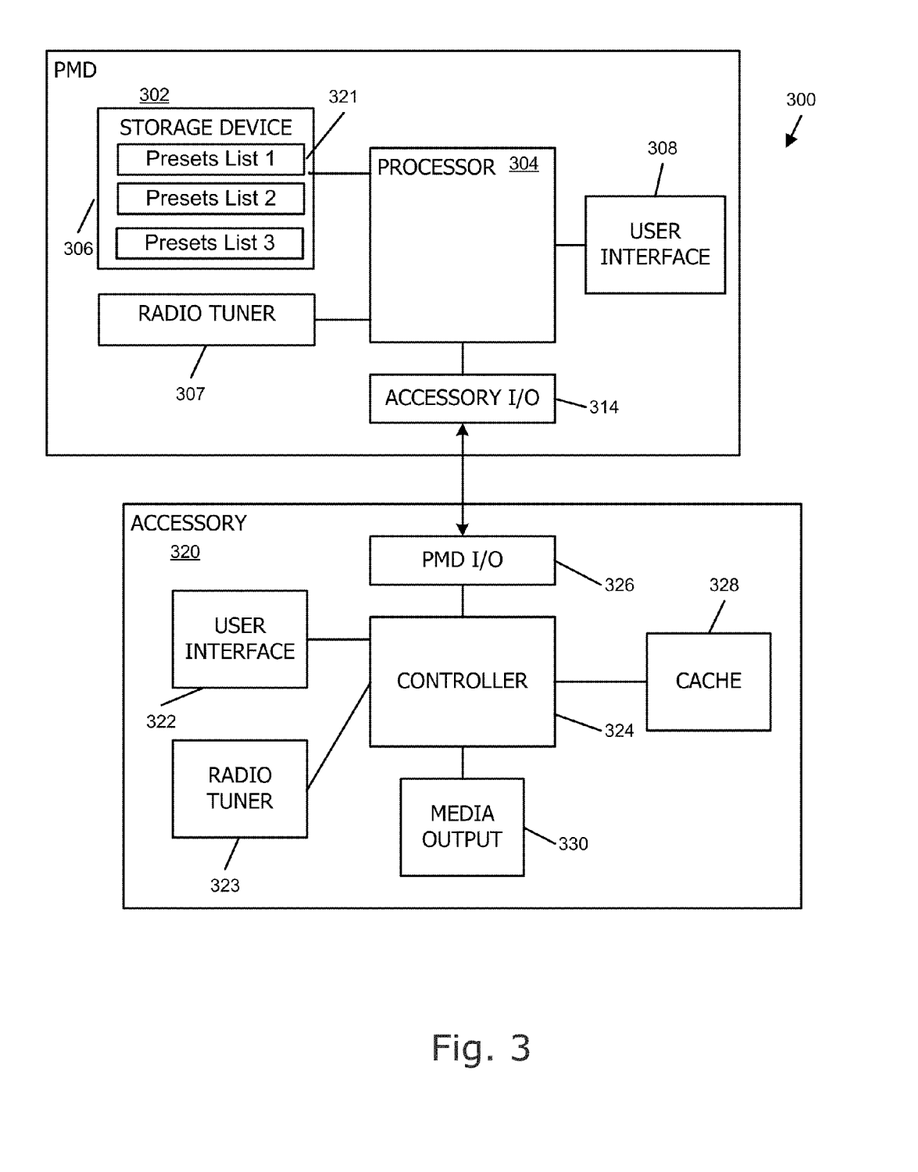
FIG. 3 is a block diagram of a system including a portable media device and an accessory according to an embodiment of the present invention.

FIG. 3 is a block diagram of system 300 according to an embodiment of the present invention. System 300 can include PMD 302 (e.g., implementing PMD 100 of FIG. 2) and an accessory 320 (e.g., implementing accessory 210 of FIG. 2).

PMD 302 in this embodiment can provide media player capability. PMD 302 can include processor 304, storage device 306, radio tuner 307, user interface 308, and accessory input/output (I/O) interface 314.

Radio tuner 307 can tune to any of the available radio stations within range. In some embodiments, radio tuner 307 can tune to any frequency associated with AM, FM, CB, Satellite, or other radio bands. Some embodiments may support fewer than all of these bands and/or other bands. Radio tuner 307 can be implemented using software and/or hardware. For example, the radio tuner may include antenna, RF filter, amplifier, demodulator, decoding circuitry, etc. In some embodiments, radio tuner 307 can accept input from processor 304 to scan the RF spectrum at a location and determine a list of radio station operating frequencies at that location. The operating frequency information can be sent to processor 304 for further processing, e.g., determining the radio stations corresponding to the various frequencies.

Storage device 306 can be implemented, e.g., using disk, flash memory, or any other non-volatile storage medium. In some embodiments, storage device 306 can store media assets, such as audio, video, still images, or the like, that can be played by host device 302. Storage device 306 can also store information about one or more radio stations, in addition to other information. Radio station information can include one or more presets lists 321. Each presets list 321 can include a listing of one or more radio stations. The one or more radio stations in each list can be identified by the name of the radio station and/or its operating frequency. Each presets list 321 can also be associated with a location. For example, each radio station presets list 321 can contain metadata that includes location information for that presets list. In some embodiments, PMD 302 can determine a location to associate with a presets list by scanning the radio frequency spectrum at the current location while the user is using the presets list. A representation or "fingerprint" of the spectrum can be stored as the location information. The fingerprint can be generated by using any part of the RF spectrum, e.g., all of the FM band, part of the FM band, a combination of FM and AM bands, etc., and can include data indicating the (relative or absolute) strength of the signals at various frequencies within the relevant part of the RF spectrum. A variety of formats may be used to represent RF spectral fingerprints. In other embodiments, PMD 302 can ascertain the current location using other location detection techniques described above.

Storage device 306 can also store other information such as information about a user's contacts (names, addresses, phone numbers, etc.), scheduled appointments and events, notes, and/or other personal information. In some embodiments, storage device 306 can store one or more programs to be executed by processor 304 (e.g., video game programs, personal information management programs, radio tuner applications, etc.).

User interface 308 can include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). A user can operate the various input controls of user interface 308 to invoke the functionality of PMD 302 and can view and/or hear output from PMD 302 via user interface 308.

Processor 304, which can be implemented as one or more integrated circuits (e.g., a conventional microprocessor or microcontroller), can control the operation of PMD 302. For example, in response to user input signals provided by user interface 308, processor 304 can instruct radio tuner 307 to tune to a particular radio station frequency that the user has selected, e.g., from a presets list. In some embodiments, processor 304 can also control user interface 308 to provide interfaces allowing the user to create, modify, and delete presets lists, and/or to select which presets list he wants to display and/or use. In some embodiments, processor 304 can instruct radio tuner 307 to scan the RF frequency spectrum, receive information relating to the spectrum from radio tuner 307, and process that information to generate a fingerprint of the spectrum.

Accessory I/O interface 314 can allow PMD 302 to communicate with various accessories. For example, accessory I/O interface 314 might support connections to an external speaker dock, a radio (e.g., FM, AM and/or satellite) tuner, an in-vehicle entertainment system, an external video device, or the like. In some embodiments, accessory I/O interface 314 includes a 30-pin connector corresponding to the connector used on iPod® products manufactured and sold by Apple Inc. Alternatively or additionally, accessory I/O interface 314 can include a different connector and/or wireless interface (e.g., Bluetooth or the like).

Presets lists can be created and modified using various techniques. In some embodiments, a user can upload one or more lists of radio station presets associated with a location to PMD 302. For example, the user can use, e.g., a host computer and the media asset management software to accomplish this task. In some embodiments, the user can select a radio station to be included in a presets list via user interface 308. In some embodiments, PMD 302 can determine a current location using any of the methods described above and upon determination of the current location, select one or more radio stations associated with that location and create a radio station presets list. In some embodiments, PMD 302 can assign metadata to the created presets list to associate the presets list with that location. (The metadata, can for instance, be a representation of the RF spectral fingerprint at the location or a location identifier associated with a particular RF spectral fingerprint.) In some embodiments, PMD 302 can use one or more criteria to create the presets list, e.g., signal strength, user preferences, prior analysis of user listening habits, specific user input indicating his likes and dislikes, analysis of other media assets stored on PMD 302, etc. For example, if a user indicates that he likes the Rock and Roll genre, the radio stations playing that genre can be included in the radio station presets list that is created.

Accessory 320 includes controller 324, user interface 322, radio tuner 323, PMD I/O interface 326, cache 328, and media output device 330. Controller 324 can include, e.g., a microprocessor or microcontroller executing program code to perform various functions such as digital audio decoding, analog or digital audio and/or video processing, and the like. User interface 322 can include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). Alternatively, output components of user interface 322 can be integrated with media output device 330. A user can operate the various input controls of user interface 322 to invoke the functionality of accessory 320 and can view and/or hear output from accessory 320 via user interface 322. In addition, in some embodiments, a user can operate PMD 302 via user interface 322. PMD I/O interface 326 can allow accessory 320 to communicate with PMD 302 (or another PMD). Examples are described below.

Cache 328, which can be implemented using volatile and/or nonvolatile memory, provides storage for various information including information obtained from PMD 302. For example, in some embodiments, accessory 320 can obtain some or all of radio station presets lists 321 from PMD 302. Any or all of this information can be stored in cache 328. In some embodiments, cache 328 can store one or more accessory radio station presets lists. The accessory radio station presets lists can be, e.g., programmed directly on the accessory by the user. The accessory radio station presets lists can be retained in cache 308 until the user erases them or replaces them with new presets lists.

Media output device 330, which can be implemented, e.g., as one or more integrated circuits, provides the capability to output various types of media. For example, media output device 330 can include a display screen or a driver circuit and connector for an external display screen, thereby enabling video and/or still images to be presented to a user. Additionally or instead, media output device 330 can also include one or more speakers or driver circuits and connectors for external speakers, thereby enabling audio to be presented to a user. In some embodiments, controller 324 can receive radio station signals from PMD 302 via PMD I/O interface 326 and can provide the signals with or without further processing to media output device 330. Media output device 330 can transform the signals as appropriate for presentation to the user. In some embodiments, media output 330 can also receive the radio signals from radio tuner 323 and can provide the signals with or without further processing to media output device 330.

Radio tuner 323 can be implemented using software and/or hardware. For example, the radio tuner may include antenna, RF filter, amplifier, demodulator, decoding circuitry, etc. In some embodiments, radio tuner 323 can tune to any radio frequency within any band, e.g., AM, FM, Satellite, CB, etc. Some embodiments may support fewer than all of these bands and/or other bands. In some embodiments, radio tuner 323 can accept input from controller 324 instructing it to tune to a particular radio frequency received via a presets list from PMD 302.

Accessory 320 can be any accessory that includes a radio tuner. Examples of accessories implementing accessory 320 include, e.g., a radio (e.g., FM, AM and/or satellite) tuner, an in-vehicle entertainment system, a home stereo system, or the like.

It will be appreciated that the system configurations and components described herein are illustrative and that variations and modifications are possible. The PMD and/or accessory can have other capabilities not specifically described herein.

Further, while the PMD and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

Accessory I/O interface 314 of PMD 302 and PMD I/O interface 326 of accessory 320 allow PMD 302 to be connected to accessory 320 and subsequently disconnected from accessory 320. As used herein, PMD 302 and accessory 320 are "connected" whenever a communication channel between accessory I/O interface 314 and PMD I/O interface 326 is open and are "disconnected" whenever the communication channel is closed. Connection can be achieved by physical attachment (e.g., between respective mating connectors of PMD 302 and accessory 320), by an indirect connection such as a cable, or by establishing a wireless communication channel. Similarly, disconnection can be achieved by physical detachment, disconnecting a cable, powering down accessory 320 or PMD 302, or closing the wireless communication channel. Thus, a variety of communication channels can be used, including wired channels such as USB, FireWire, or universal asynchronous receiver/transmitter ("UART"), or wireless channels such as Bluetooth. In some embodiments, multiple communication channels between a media player and an accessory can be open concurrently, or a media player can be connected to multiple accessories, with each accessory using a different communication channel.

Regardless of the particular communication channel, as long as PMD 302 and accessory 320 are connected to each other, the devices can communicate by exchanging commands and data according to a protocol. The protocol defines a format for sending messages between PMD 302 and accessory 320. For instance, the protocol can specify that each message be sent in a packet with a header and an optional payload. The header provides basic information (e.g., a start indicator, length of the packet, and a command to be processed by the recipient), while the payload provides any data associated with the command; the amount of associated data can be different for different commands, and some commands can provide for variable-length payloads. In various embodiments, the protocol can define specific commands to indicate an action to be taken by the recipient; to signal completion of a task, change of state, or occurrence of an error; and/or to identify the nature of the associated data. In some embodiments, the commands can be defined such that a particular command is valid in only one direction. The packet can also include error detection or error correction codes as known in the art.

The protocol can define a number of "lingoes," where a "lingo" is a group of related commands that can be supported (or unsupported) by various classes of accessories. In some embodiments, a command can be uniquely identified by a first byte identifying the lingo to which the command belongs and a second byte identifying the particular command within the lingo. Other command structures can also be used. It is not required that all accessories, or all PMDs to which an accessory can be connected, support every lingo defined within the protocol.

In some embodiments, every accessory 320 and every PMD 302 that are designed to be interoperable with each other support at least a "general" lingo that includes commands common to all such devices. The general lingo can include commands enabling the PMD and the accessory to identify themselves to each other and to provide general information about their respective capabilities, including which (if any) other lingoes each supports. The general lingo can also include authentication commands that the PMD can use to verify the purported identity and capabilities of the accessory (or vice versa), and the accessory (or PMD) can be blocked from invoking certain commands or lingoes if the authentication is unsuccessful.

In some embodiments, the accessory and the PMD can interoperate to provide the user with an enhanced radio listening experience by sharing presets lists. For example, the PMD can send a presets list to the accessory; and the user can interact with the accessory to select a radio station from the presets list. In some embodiments, the user can operate the accessory to create his own presets list or update a presets list received from the PMD and can upload the created and/or updated list from the accessory to the PMD.

Figure 4:
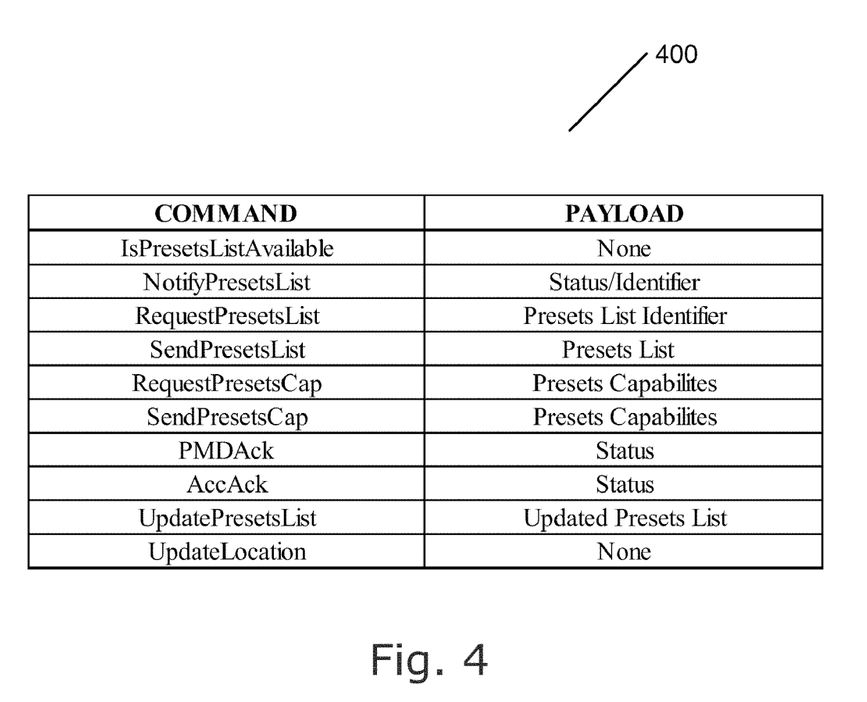
FIG. 4 is a table listing commands that can be used to exchange information between a portable media device and an accessory according to an embodiment of the present invention.

FIG. 4 shows table 400 listing commands that can be used to communicate radio station presets information between a PMD and an accessory according to an embodiment of the present invention. These commands can be incorporated into a tuner lingo (or other group of commands) within a communication protocol supported by the PMD and the accessory, thereby allowing the PMD and the accessory to exchange radio station presets information.

The AccAck command can be sent by the accessory to the PMD. The payload of the AccAck command can include one or more status bits to indicate whether the command was received successfully. In the event of an error, the status bits can also indicate the type of error, e.g., bad parameter, invalid command, etc. In some embodiments, an AccAck command indicating success is sent in instances where no other responsive command is sent. In other embodiments, an AccAck command is sent only if an error occurs.

The PMDAck command can be sent by the PMD to the accessory. The PMDAck command can operate similarly to the AccAck command described above.

The IsPresetsListAvailable command can be sent by the accessory to the PMD. The command, which does not require a payload, can be used by the accessory to inquire whether the PMD has a presets list available for a location. The PMD can respond with a NotifyPresetsList command described below.

The NotifyPresetsList command can be sent by the PMD to the accessory, e.g., in response to the IsPresetsListAvailable command. The payload can be a notification indicating whether a presets list is available or not, or an identifier of an available presets list. The presets list identifier can be a unique identifier assigned to each presets list in order to enable quick and accurate retrieval of the presets lists. In some embodiments, the results can be location dependent; for example, the PMD can determine current location (e.g., by scanning the RF spectrum) and determine whether any of its stored presets lists are associated with the current location. At a location where no radio signals are present, no presets list would be available. In this scenario, the PMD can inform the accessory that no presets list is available. In some embodiments, the PMD can send this command automatically without waiting for the IsPresetsListAvailable command; examples are described below.

The RequestPresetsList command can be sent by the accessory to the PMD. The payload can be a presets list identifier that the accessory wants to download. In some embodiments, the PMD can include a presets list identifier with the NotifyPresetsList command, and the accessory can use this identifier to request a particular presets list from the PMD using the RequestPresetsList command.

The SendPresetsList command can be sent by the PMD to the accessory. The payload can be the presets list requested by the accessory. In some embodiments, the accessory can include the presets list identifier in the request to the PMD, as described above. The PMD can use the identifier to locate the appropriate presets list and send that presets list to the accessory. In some embodiments, the PMD can select a presets list and send the presets list to the accessory without waiting for a request from the accessory.

The RequestPresetsCap command can be sent by the PMD to the accessory to request capability information related to radio station presets. The payload can be a bit mask identifying the capability information requested. The requested capability information can include information about the maximum number of presets that the accessory can accept, the bands of radio stations that the accessory can operate in, e.g., AM, FM, Satellite, CB etc., a maximum number of presets per radio station band that the accessory can accept, whether accessory can display radio station names, etc. In some embodiments, the presets capability information may be requested using a command that can also be used to request other tuner related capability information from the accessory.

The SendPresetsCap command can be sent by the accessory in response to the RequestPresetsCap command. The payload can include the capability information requested by the PMD. If the accessory does not support a particular capability about which information was requested by the PMD, it can return an AccAck command to indicate its inability to send information about the requested capability. In addition, if the RequestPresetsCap command requests multiple information items, each information item requested can be provided in a separate SendPresetsCap command. In some embodiments, the presets capability information may be provided using a command that can also be used to provide other tuner related capability information to the PMD.

The UpdatePresetsList command can be sent by the accessory to the PMD. The payload can be the updated presets list. In some embodiments, the user of the accessory can change the presets on the accessory while the accessory is using the presets list communicated by the PMD. For example, the user can instruct the accessory to change the current presets list (e.g., adding, deleting, or replacing a station) by operating the accessory user interface, e.g., by pressing a button. In response to this change, the accessory can update the presets list and use the UpdatePresetsList command to upload the changes to the presets list to the PMD. In some embodiments, the PMD can replace its own presets list for that location with the updated presets list received from the accessory. In other embodiments, the PMD can store the updated presets list in addition to the existing presets list for that location.

The UpdateLocation command can be sent by the accessory to the PMD. In response, the PMD can update its location using any of the methods described above, e.g., RF spectral fingerprint, GPS, etc. In some embodiments, the user can operate the accessory user interface, instructing the accessory to send the UpdateLocation command to the PMD. The PMD can update its location in response to the command and check whether a different presets list is associated with the location. The accessory can be notified if a different presets list is available, e.g., with the NotifyPresetsList command. The user can then have an option of either accepting the different presets list or continuing to use the current presets list.

It will be appreciated that the commands described herein are illustrative and that variations and modifications are possible. For instance, additional commands can be used to facilitate communication of the presets list between the PMD and the accessory. Further, not all of the commands described herein need be supported, and other protocols can be used.

Figure 5:
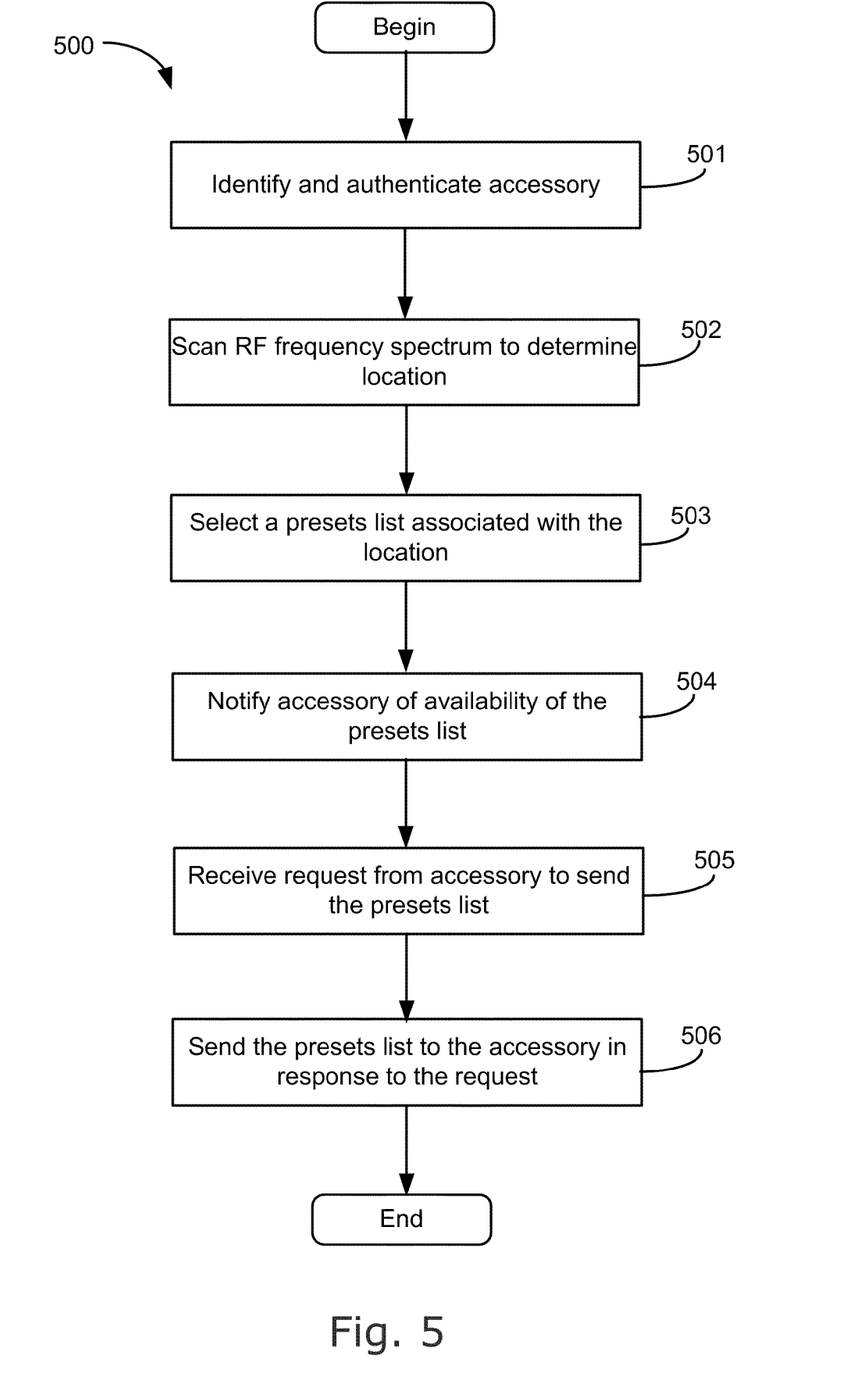
FIG. 5 is a flow diagram of a process that can be used by a portable media device to communicate radio presets information to an accessory according to an embodiment of the present invention.

FIG. 5 is a flow diagram of a process 500 for communicating radio station presets list information to an accessory according to an embodiment of the present invention. Process 500 can be performed, e.g., by PMD 302 of FIG. 3. At block 501, the PMD can authenticate and identify the accessory, e.g., using one or more commands from the general lingo described above. Once the accessory is authenticated, it can exchange information with the PMD.

At block 502, the PMD can scan the RF spectrum using its tuner to determine a current location based on the available radio signals or stations in the area, as described above. Based on the available radio stations and/or their relative signal strengths, the PMD can determine the current location. For example, PMD can build up a spectral fingerprint indicating signal strengths associated with various frequencies and compare the spectral fingerprint to a database that associates spectral fingerprints with locations.

At block 503, the PMD can select a list of radio station presets associated with the current location. In some embodiments, the spectral fingerprint (or a location extracted from a database using the spectral fingerprint) can be compared to the location information associated with various presets lists stored in the PMD to select the appropriate presets list for a location. In some embodiments, the PMD can use other location determination methods, e.g., as described above. In some embodiments, if a radio station presets list is not already available for the current location, the PMD can generate a list of radio station presets using one of the techniques described above. At block 504, the PMD can notify the accessory of the availability of a radio station presets list for the current location, e.g., using the NotifyPresetsList command. At block 505, the PMD can receive a request from the accessory to send the presets lists. For example, the accessory can use the RequestPresetsList command described above to request the presets lists.

Upon receiving the request from the accessory, the PMD can send the presets list to the accessory at block 506. (In some embodiments, if no presets list is available for the current location, the PMD can indicate that a presets list is not available.) The PMD can use the SendPresetsList command described above to send the presets list. In some embodiments, the accessory can send an AccAck command to the PMD indicating successful receipt of (or failure to receive) the presets list.

It will be appreciated that process 500 described herein is illustrative and that variations and modifications are possible. Acts described as sequential can be executed in parallel, order of acts can be varied, and acts can be modified or combined. For instance, blocks 504 and 505 can be omitted and the PMD can send the selected presets list to the accessory without notifying the accessory of its availability and without waiting for the accessory to request the presets list. Further, after block 506, the accessory and the PMD can remain connected, and the PMD can provide different presets lists to the accessory.

Figure 6:
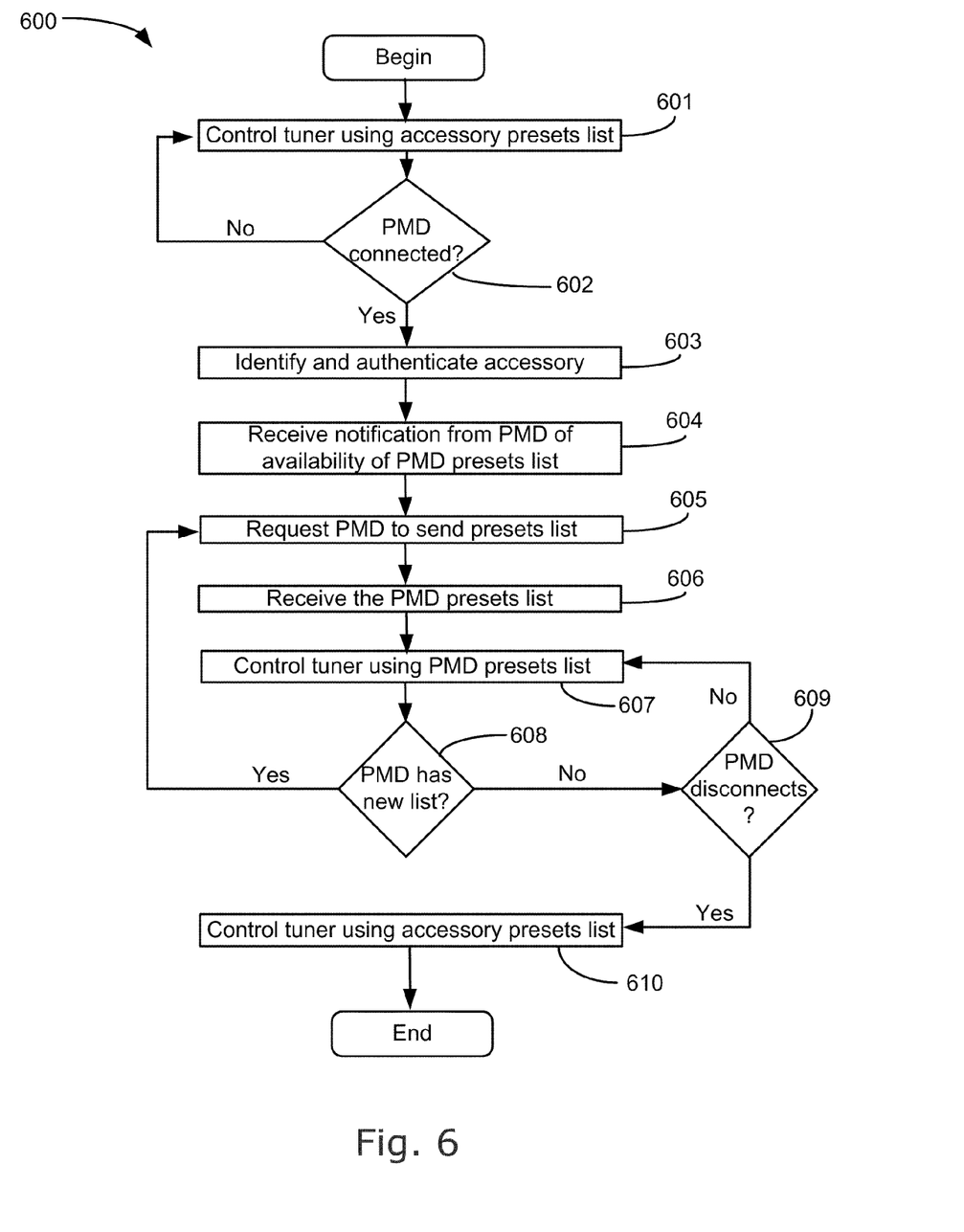
FIG. 6 is a flow diagram of a process that can be used by an accessory to exchange radio presets information with a portable media device according to an embodiment of the present invention.

FIG. 6 is a flow diagram of a process 600 for exchanging radio station presets list information between an accessory and a PMD according to an embodiment of the present invention. Process 600 can be implemented, e.g., in accessory 320 of FIG. 3. At block 601, the accessory can use its own radio tuner to play a radio station of the user's choosing. In some embodiments, the accessory can have its own presets list, and the user can choose a radio station from that presets list. In some embodiments, the user can manually tune to a particular radio station. At block 602, the accessory can check whether a PMD is connected to the accessory. If it is determined at block 602 that the PMD is not connected, the accessory can continue radio playing operations at block 601. On the other hand, if it is determined at block 602 that the PMD is connected, the accessory can then identify itself and PMD can authenticate the accessory at block 603, e.g., using one or more commands from the general lingo described above.

At block 604, the accessory can receive notification from the PMD that a radio station presets list is available for the current location. In some embodiments, the accessory can send an inquiry to the PMD asking if a presets list is available for the current location, e.g., using the IsPresetsListAvailable command described above, and the PMD can respond to that inquiry, e.g., using the NotifyPresetsList command described above. In other embodiments, the PMD can notify the accessory of availability of a presets list without waiting for an inquiry from the accessory. At block 605, the accessory can request the presets list from the PMD, e.g., using the RequestPresetsList command described above. The accessory can receive the presets list from the PMD at block 606. In some embodiments, the accessory can send an AccAck command to the PMD indicating receipt of the presets list or an error message in the event of failure to receive the presets list. During the execution of actions illustrated by blocks 602 to 606, the user can continue to listen to a radio station that the accessory is tuned to without interruption.

At block 607, the accessory can save the presets list that it was previously using ("default presets") and instead can use the presets list received from the PMD. In some embodiments, the accessory may assign the radio stations included in the presets list received from the PMD to its preset buttons to enable user to choose a radio station. In some embodiments, the accessory can wait for user input before it tunes to a radio station from the received presets list.

At block 608, the accessory can check periodically to see if the PMD has a different presets list. In some embodiments, the accessory can send the IsPresetsListAvailable command to the PMD. In some embodiments, the accessory can send the UpdateLocation command to the PMD. In other embodiments, the PMD can periodically update its location and communicate that a different presets list is available without a specific request from the accessory.

If at block 608, it is determined that the PMD has a different presets list, the accessory can request the new presets list from the PMD, and processing returns to block 605. If at block 608 it is determined that the PMD does not have a different presets list (or if an error message is received by the accessory), the accessory can check whether the PMD is disconnected from the accessory at block 609. If it is determined at block 609 that the PMD has not been disconnected from the accessory, the accessory can continue to use the previously received PMD presets list and processing returns to block 607.

If at block 609, it is determined that the PMD has been disconnected from the accessory, the accessory can resume controlling its tuner based on its default presets list at block 610. Thus, in some embodiments, the accessory can automatically revert to its own default presets list upon disconnection from the PMD. This can be convenient where multiple users with different PMDs share use of an accessory. For example, if a user borrows his friend's automobile that has a compatible in vehicle stereo system (an accessory), the user can transfer a presets list from his PMD to the in vehicle stereo system and have easy access to his preferred stations while driving. Once the user disconnects his PMD, the in vehicle stereo system can revert to using the friend's presets so that the friend is not inconvenienced. In other embodiments, the accessory can continue to use the presets list most recently received from the PMD after the PMD is disconnected.

It will be appreciated that process 600 described herein is illustrative and that variations and modifications are possible. Acts described as sequential can be executed in parallel, order of acts can be varied, and acts can be modified or combined. For instance, the accessory can receive the presets list from the PMD without having to request the presets list at block 605. In some embodiments, the accessory can receive a request from the PMD to provide information about the presets capability of the accessory prior to receiving the presets list. The PMD can, for example, limit the number of presets included in the presets list based on the number of presets that the accessory can accept, limit the radio stations included in the presets list to the band(s) that the accessory tuner supports, and so on.

Figure 7:
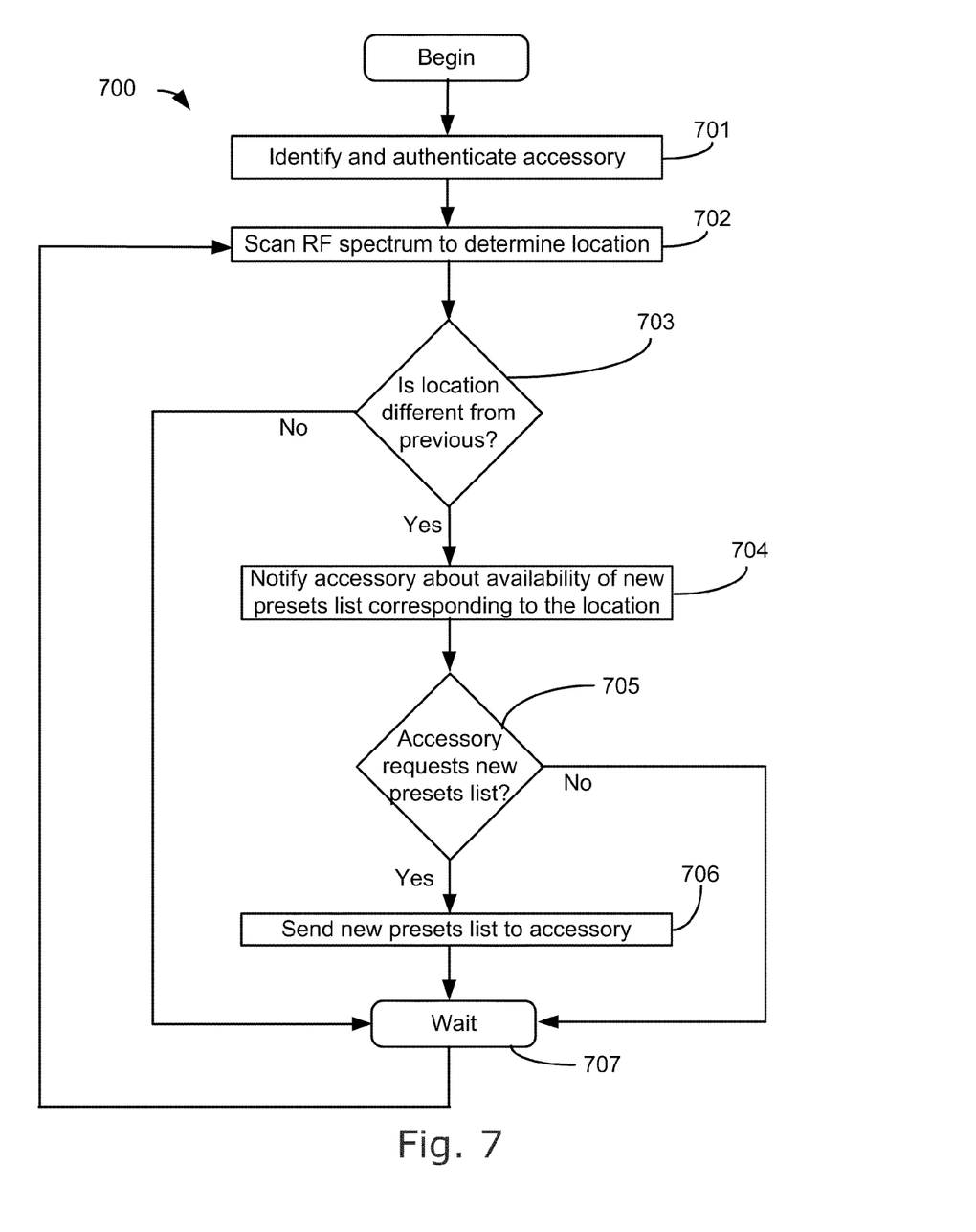
FIG. 7 is a flow diagram of a process that can be used by a portable media device to communicate radio station presets list according to an embodiment of the present invention.

FIG. 7 is a flow diagram of a process 700 that can be used by a PMD for updating location, determining the associated presets list and communicating the new presets list to the accessory, according to an embodiment of the present invention. Process 700 can be performed, e.g., by PMD 302 of FIG. 3. At block 701, the PMD can identify and authenticate the accessory in a similar manner as described in connection with process 600 above. At block 702, the PMD can scan the RF spectrum to determine the current location. In some embodiments, the PMD may use other techniques, described above, to determine the current location. The accessory can have its own tuner, enabling the user to listen to a radio station while the PMD scans the RF spectrum.

At block 703, the PMD can determine whether the current location is different from the previous location. In some embodiments, the determination can be based on various criteria. For example, the PMD can report a location change if the difference between the current location and the previous location is at least 50 miles. In some embodiment, the determination can be based on detecting a predetermined change between the previous and current spectral fingerprint, e.g., by comparing operating frequencies and/or signal strengths of radio stations at the previous location to the radio stations at the current location, and reporting a location change only if the differences exceed some threshold criterion. The criteria can be optimized to avoid the PMD reporting location change frequently in situations where the current location can have the same presets list associated with it as the previous location (e.g., when the PMD is in a moving vehicle). In some embodiments, if one presets list is currently in use, the PMD can report a location change if it determines that a different presets list is associated with the current location. In this embodiment, PMD can compare the new location data with location information in the metadata of the various stored presets lists. If the new location data matches location information in the metadata of a different presets list (e.g., any presets list other than the one currently in use), the PMD can conclude that location has changed.

If at block 703, it is determined that the current location is the same as the previous location, no further action is taken. Process 700 can wait at block 707 for some time, e.g., 10 minutes, then scan the RF spectrum again at block 702. In some embodiments, the wait time can be determined dynamically. For example, the wait time can be shortened or lengthened by periodically comparing the current location to the previous location. In the event that the difference between the current location and previous location exceeds a threshold value, e.g., the PMD is in a fast moving vehicle, the wait time can be shortened, e.g., to 2 minutes. In other instances where the difference in locations is below the threshold value, e.g., the PMD is stationary; the wait time can be increased, e.g., to 30 minutes. However, if it is determined at block 703 that there has been a change in location, the PMD can notify the accessory at block 704 that a different presets list (a list associated with the current location) is available. At block 705, the PMD can check whether the accessory has requested the different presets list. If the accessory does not request the different presets list, the PMD can wait at block 707, then scan the RF spectrum again, as described above. If the accessory requests the different presets list, the PMD can send the different presets list to the accessory at block 706.

It will be appreciated that process 700 described herein is illustrative and that variations and modifications are possible. Acts described as sequential can be executed in parallel, order of acts can be varied, and acts can be modified or combined. For instance, the PMD may not wait for the accessory to request the new presets list at block 705. Instead, the PMD may automatically send the presets list to the accessory once it determines that a new presets list is available. In some embodiments, the PMD may receive the UpdateLocation command prior to block 702.

Embodiments described herein provide for communication of radio station presets lists between a PMD and an accessory. In some embodiments, the PMD can determine a current location, select a presets list associated with that location, and provide that presets list to the accessory. In some embodiments, the accessory can accept a presets list from the PMD when connected to the PMD, and upon disconnection from the PMD, the accessory can revert to its own built in presets list. In some embodiments, a user operating the accessory can change the presets list received from the PMD and communicate the updated list to the PMD. In some embodiments, the PMD can, periodically or upon request by the accessory, update its location and determine if a different presets list is available for that location. If a different presets list is available, the PMD can provide the different presets list to the accessory. The accessory can play a radio station using its own tuner while the PMD can scan the RF spectrum using another radio tuner and/or execute other operations such as creating, selecting, and/or sending a presets list, thereby providing the user with an uninterrupted listening experience.

While the invention has been described with respect to specific embodiments, those skilled in the art will recognize that numerous modifications are possible. For instance, the PMD can limit the number of radio stations included in any given presets list sent to the accessory. In some embodiments, the maximum number of radio stations included in a presets list that is sent to an accessory matches the maximum number of presets that the accessory can accommodate. For example, for location A, the PMD may have a presets list with 30 radio stations. However, the accessory may be configured to accept a maximum of 10 presets. (It is understood that the particular numbers in this example are illustrative.) In this scenario, the PMD can choose the 10 most relevant stations from among the 30 and include only the chosen 10 stations in the presets list sent to the accessory. The selection of the 10 stations can be based on various criteria including signal strength, user preference for a genre or artist associated with one or more of the stations, user listening history, and/or analysis of media tracks stored on the PMD as compared to information about various radio stations. The PMD can also limit the number of radio stations included in the presets list based on what bands the accessory tuner supports and/or other considerations.

Although embodiments described above may make reference to conventional radio bands and/or signals, one skilled in the art will recognize that certain embodiments are also applicable to other types of broadcast media, e.g., Internet radio, Internet TV, or the like.

A PMD can use techniques other than RF spectral fingerprinting to determine location. For instance, the PMD can use GPS, cellular phone tower triangulation, wireless access points, etc. to determine location.

In addition, embodiments of the present invention can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various computer readable media for storage and/or transmission; suitable media include magnetic disk or tape, optical storage media such as compact disk (CD) or DVD (digital versatile disk), flash memory, and the like. Computer readable media encoded with the program code can be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A portable media device comprising:
a first radio tuner;
an accessory interface configured to communicate with an accessory having a second radio tuner;
a storage medium configured to store a plurality of radio station presets lists, each of the plurality of radio station presets lists being associated with a location; and
a processor coupled to the first radio tuner, the accessory interface, and the storage medium, the processor being configured to determine a current location, to select a list of radio station presets, from the plurality of radio station presets lists, based at least in part on the current location, and to communicate the selected list of radio station presets to the accessory via the accessory interface.

2. The portable media device of claim 1 wherein the accessory interface is configured to communicate with the accessory using a set of commands, the set of commands including:
a first command receivable by the portable media device from the accessory, the first command requesting a list of radio presets associated with the current location; and
a second command sendable by the portable media device to the accessory, the second command including the list of radio presets associated with the current location.

3. The portable media device of claim 2 wherein the set of commands further includes:
a third command sendable by the portable media device, the third command requesting preset capabilities from the accessory; and
a fourth command receivable by the portable media device, the fourth command including the preset capabilities.

4. The portable media device of claim 1 wherein the processor determines the current location using an internal a global positioning satellite (GPS) receiver.

5. The portable media device of claim 1 wherein the processor determines the current location based on analysis of a plurality of radio signals detected by the first radio tuner.

6. The portable media device of claim 1 wherein the processor determines the current location by comparing a fingerprint created from scanning a RF spectrum at the current location to a plurality of fingerprints included in a database, wherein each of the plurality of fingerprints is associated with a location.

7. The portable media device of claim 1 wherein each of the plurality of lists of radio station presets includes information about one or more radio stations, and
wherein the one or more radio stations are ranked based one or more criteria, the one or more criteria include signal strength, user preference, user listening history, or information about other media assets stored in the portable media device.

8. A method for use in a portable media device communicably coupled to an accessory, the method comprising:
requesting radio station presets capabilities information from the accessory;
receiving radio station presets capabilities information from the accessory;
prioritizing listing of radio stations within the radio stations presets list, the prioritizing based at least in part on the radio station presets capabilities information; and
sending the radio station presets list to the accessory.

9. The method of claim 8 wherein the radio station presets capabilities information includes information about a maximum number of presets that the accessory can accept.

10. The method of claim 9 wherein the listing of radio stations in the radio station presets list equals the maximum number of presets that the accessory can accept.

11. A computer-readable medium containing program instructions that, when executed by a processor within a portable media device, cause the processor to execute a method of communicating a radio station presets list to an accessory, the method comprising:
determining a current location;
selecting a radio station presets list associated with the current location, the radio station presets list being selected from among a plurality of radio station presets lists stored on the portable media device, wherein each radio station presets list is associated with a location;
providing the selected radio station presets list to the accessory;
notifying the accessory that the selected radio station presets list is available; and receiving a request from the accessory to send the selected radio station presets list.

12. The computer-readable medium of claim 11 wherein determining a current location includes:
scanning, using a radio tuner, a radio frequency spectrum at the current location to receive a plurality of radio signals; and
analyzing the plurality of radio signals to determine the current location.

13. The computer-readable medium of claim 11 wherein selecting a radio station presets list includes:
analyzing location data associated with each of the plurality of radio station presets lists; and
selecting a radio station presets list whose location data matches the current location.

14. The computer-readable medium of claim 11 wherein the portable media device communicates with the accessory using a set of commands, the set of commands including:
a first command sendable to the accessory, the first command notifying the accessory of availability of the radio station presets list;
a second command receivable from the accessory, the second command requesting the radio station presets list; and
a third command sendable to the accessory, the third command including the requested radio station presets list.

15. The computer-readable medium of claim 11 further comprising:
determining a new location;
selecting a new radio station presets list associated with the new location, in the event that the new location is different from the current location; and
providing the new radio station presets list to the accessory.

16. An accessory comprising:
a first radio tuner;
a storage medium configured to store a first radio station presets list;
a device interface configured to communicate with a portable media device having a second radio tuner;
a controller coupled to the first radio tuner and the device interface, the controller being configured to receive a second radio station presets list from the portable media device, the second radio station presets list being associated with a current location.

17. The accessory of claim 16 wherein the device interface is configured to communicate with the portable media device using a set of commands, the set of commands including:
a first command receivable by the accessory, the first command requesting presets capability of the accessory;
a second command sendable by the accessory, the second command including the presets capability;
a third command receivable by the accessory, the third command notifying availability of the radio station presets list;
a fourth command sendable by the accessory, the fourth command requesting the radio station presets list; and
a fifth command receivable by the accessory, the fifth command including the radio station presets list.

18. The accessory of claim 16 further comprising a user input device coupled to the device interface, the user input device configured to provide user input, to the device interface, the user input requesting a new radio station presets list from the portable media device.

19. The accessory of claim 16 further including a user interface, the user interface configured to select the first radio station presets list if the portable media device is not connected to the accessory and to select the second radio station presets list if the portable media device is connected to the accessory.

20. A method for use in an accessory communicably coupled to a portable media device, the method comprising:
receiving a request from the portable media device to communicate radio station presets capabilities information;
sending the radio station presets capabilities information to the portable media device;
requesting a radio station presets list from the portable media device, the radio station presets list being associated with a current location; and
receiving the radio station presets list from the portable media device, the radio station presets list based at least in part on the radio station presets capabilities information.

21. The method of claim 20 wherein the presets capabilities include information about a maximum number of presets that the accessory can accept.

22. A computer-readable medium containing program instructions that, when executed by a controller within an accessory having a first radio station presets list, cause the controller to execute a method of communicating radio station presets information with a portable media device, the method comprising:
requesting a second radio station presets list from the portable media device, the second radio station presets list being associated with a first location;
receiving the second radio station presets list from the portable media device; and
associating a plurality of accessory controls with radio stations included in the second radio station presets list.

23. The computer-readable medium of claim 22 further including prior to requesting the second radio station presets list:
receiving notification from the portable media device indicating availability of the second radio presets list.

24. The computer-readable medium of claim 22 further including:
instructing the portable media device to update location; and
receiving a new radio station presets list from the portable media device in the event that the updated location is different from the first location.

25. The computer-readable medium of claim 22 further including:
modifying the second radio station presets list to generate a third radio station presets list; and
communicating the third radio station presets list to the portable media device.

26. The computer-readable medium of claim 22 further including:
reverting to the first radio station presets list when the portable media device is disconnected from the accessory.

* * * * *